INVENTOR.
RALPH O. WEBER
FRANCIS E. HORAN

BY Cecil C. Schmidt

AGENT

United States Patent Office 3,271,267
Patented Sept. 6, 1966

1

3,271,267
BIOCHEMICAL SYNTHESIS OF
INDUSTRIAL GUMS
Ralph O. Weber, St. Paul, and Francis E. Horan, Minneapolis, Minn., assignors to Archer-Daniels-Midland Company, Minneapolis, Minn., a corporation of Delaware
Filed July 29, 1964, Ser. No. 385,943
20 Claims. (Cl. 195—31)

This application is a continuation-in-part of Serial No. 212,521, filed July 26, 1962 (now abandoned).

The present invention relates to the biochemical synthesis of industrial gums and to the gums and gum products thus produced. In another aspect, this invention relates to an improved biochemical process for synthesizing improved water-soluble polysaccharide gums. In still another aspect, this invention relates to an improved biochemical process for converting certain carbohydrates (e.g. sorghum flour) into water-soluble polysaccharides by the action of bacteria of the genus Xanthomonas.

Industrial gums (i.e., polysaccharides) produced by the bacterial fermentation of carbohydrates are known in the art and find a variety of applications due to their tremendous thickening power. For example, these gums are useful in the beer industry as foam enhancers, and as thickeners in oil well drilling fluids.

The gums produced by certain species of the genus Xanthomonas have useful properties not present, to the same degree or in the same combination, in other gums now available to users. The properties referred to include, among others, stability to heat, tolerance of salts, and a constant viscosity of aqueous dispersions of the gums over a wide pH range. These properties have been described, to some degree, in References 3 and 5 as hereinafter cited. Other desirable properties present in the inventive gums of the present invention include a lack of demonstrable toxicity when fed to laboratory animals, uniformity, low bacteria counts in the finished product, easy dispersability, improved color, and negligible odor and taste under conditions of use.

Various known methods for the biochemical production of polysaccharides with Xanthomonas organisms are described in the following prior art references:

(1) Leach, J. G., Lilly, V. G., Wilson, H. A. and Purvis, M. R., Jr. Bacterial Polysaccharides: The Nature and Function of the Exudate Produced by *Xanthomonas phaseoli*. Phytopathology, 47, 113, 1957.

(2) Lilly, V. G., Wilson, H. A., and Leach, J. G. Bacterial Polysaccharides II. Laboratory-scale Production of Polysaccharides by Species of Xanthomonas. Applied Microbiology 6, 105, 1958.

(3) U.S.D.A. Northern Utilization Research and Development Division. Information on Polysaccharide B-459. September 1959.

(4) Rogovin, S. P., Anderson, S. F., and Cadmus, M. C. Production of Polysaccharide with *Xanthomonas campestris*. Journal of Biochemical and Microbiological Technology and Engineering, 3, 51, 1961.

(5) Jeanes, Allene, Pittsley, J. E., and Senti, F. R. Polysaccharides B-1459: A New Hydrocolloid Polyelectrolyte. Produced from Glucose by Bacterial Fermentation. Journal of Applied Polymer Science, 5, 519, 1961.

(6) U.S. Patent No. 3,020,206 of Patton et al.

(7) Wilkinson, J. R. The Extracellular Polysaccharides of Bacteria. Bacteriological Reviews, 22, 46, 1958.

In practicing the present invention, which represents an improvement over this prior art, bacteria of the genus Xanthomonas are used to convert a farinaceous substrate such as a cereal grain flour (e.g., sorghum flour) into a polysaccharide material or gum. Gums, as the term is used herein, are very high molecular weight polysaccharides which are soluble in water and insoluble in many organic solvents. Water solutions of these gums possess a high viscosity at relatively low gum concentrations, and many of the useful properties of these gums are the result of this characteristic. The viscosity measurements reported in this disclosure were made on the entire fermented culture material (i.e., the crude liquid) or on dispersions of dry gum in distilled water. Measurements were made using a model LVF Brookfield Viscometer operating at 30 r.p.m. and at 28° C.

The present invention provides a new and improved process for the synthesis of Xanthomonas gums. This process produces a gum product having performance properties superior to the prior art gums. Moreover, the present process offers, among other things, a reduction in the time required for fermentation. The time saved ranges from a 30% saving over one described process to an 88% reduction in time over a second described process (see Table IV). In all cases, higher conversion of the carbohydrate to gum is obtained from the present process, in a shorter time interval, than can be achieved by any of the known processes of the prior art.

While the pure gums produced by the inventive process appear to be substantially identical (qualitatively) with similar gums prepared by prior art processes, the inventive gum products possess certain additional, desirable characteristics. These desirable characteristics can only be described, conveniently, by means of the processes for making the gums. The apparent qualitative identity of the pure gums has been demonstrated by infrared spectrographic analysis, by comparisons of viscosity curves, and by comparison of other common significant chemical and physical properties. In spite of this apparent similarity, the inventive gum products do have some desirable characteristics not present in their prior art counterparts. It is thought that these characteristics may be due in part to the different protein content of the inventive gum products and to the presence of buffer salt in the preferred gum products.

The present invention can be better understood by reference to the following description and examples, taken in conjunction with the drawings in which.

Figure 1:
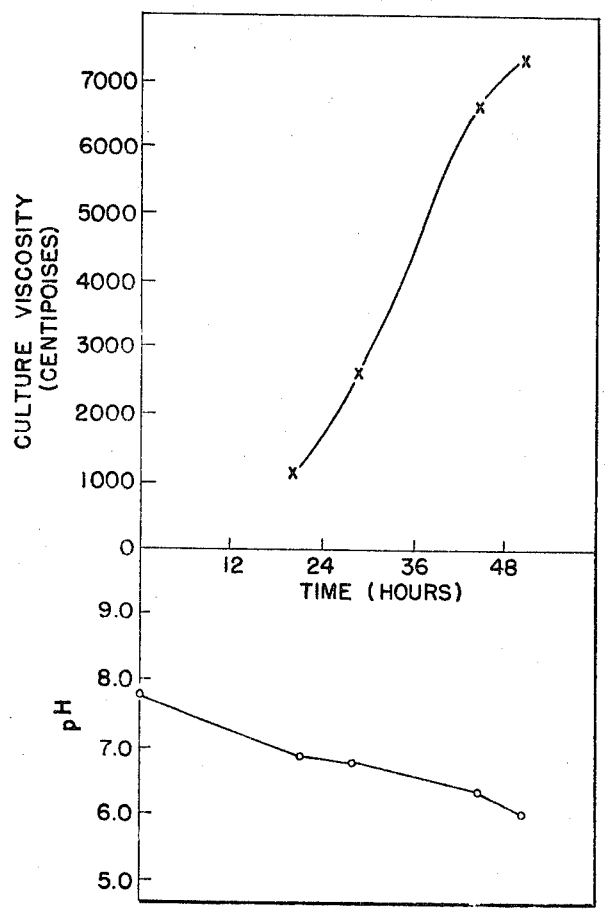
FIGURE 1 is a graph depicting, representatively, the changes in pH and culture viscosity that occur as a function of fermentation time.
Figure 2:
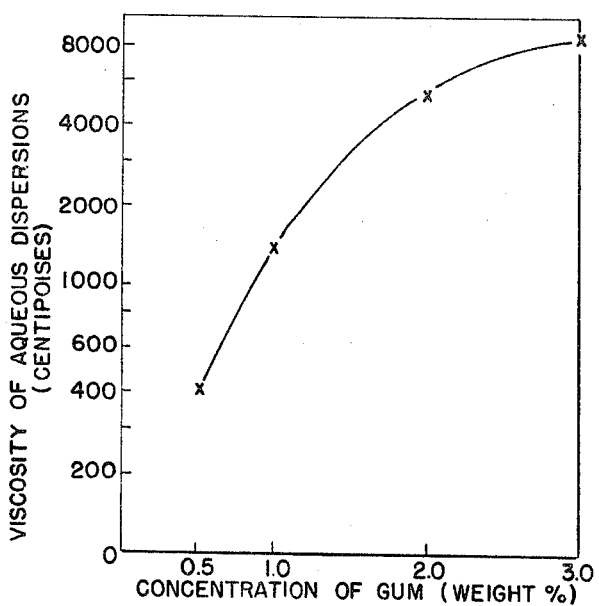
FIGURE 2 is a graph depicting, representatively, the effect of gum concentration on the viscosity of a dispersion of the inventive gum product in distilled water.

According to the present invention, gum is produced by an aerobic fermentation process using bacteria of the genus Xanthomonas. The broth or culture medium contains farinaceous nutrient (i.e. a cereal grain), preferably in finely ground, dehulled and degerminated form. Less preferably, finely ground whole grain, etc., may be used. A mixture of grains may be used. This broth will contain adequate sources of carbohydrate and organic nitrogen, vitamins and salts as is usual in the art. The broth is then sterilized, usually by heat, and then cooled before being inoculated with an actively growing culture of a selected bacterium. When heat is used to accomplish sterilization (this is the most common and preferred technique) it serves an additional function of gelatinizing a part of the starch fraction of the farinaceous nutrient, thereby rendering it more water soluble. Since increased water solubility of the nutrient material is desirable, this is a useful phenomenon. If desired, other techniques may be used to treat the nutrient material to solubilize it. Initially, the pH of the broth should be about 7 to 8.5. Sterile air is then bubbled through or otherwise contacted with the inoculated culture medium during the period of fermentation to supply the aerobic conditions required for this process. Preferably, air is bubbled through the medium continuously and in an amount sufficient to produce the desired results. Agitation, by a mechanical mixing device, or otherwise, is preferably used to improve the aeration of the medium and to keep the bacteria dispersed. The temperature is preferably maintained within the range of about 21° C. to about 35° C. The fermentation may be conducted either as a batch process or as a continuous procedure. Combinations of batch and continuous processes may be used. Asepsis, or avoidance of the introduction of contamination, must be practiced at all time. When the fermentation has reached the desired end-point, as indicated by a drop in pH (a pH of about 5–7 at the endpoint) and an increase in viscosity, the product is recovered by any suitable procedure. Culture viscosity is ordinarily used as the controlling variable of the process, and the process is usually halted when the culture viscosity is from about 4000 to 12,000 centipoises. Sometimes it may be desirable to halt the process sooner e.g. at 2500 centipoises. The preferable procedure for product recovery is by spray drying.

Differences in the amount of active ingredient (i.e. pure gum) present in any commercial gum product will vary from one product to another according to the recovery and purification procedures used. The amount (weight percent) of pure Xanthomonas gum present in the finished gum product of this invention generally ranges from 50% to 90%, more usually from 55% to 85%, e.g. from 60% to 75%, based upon viscosity measurements. By this improved process, bacteria counts of the recovered polysaccharide gum may run as low as zero per gram. While such gum products may be made with higher bacteria counts (e.g. 1000 or less), the preferred product for food use is a finished gum with a low bacteria count. None of the bacteria of the genus Xanthomonas survive proper heat pasteurization. The heat pasteurization, as is known to those skilled in the art, is carried out in a manner not to destroy the gum.

It is well known that many industrial fermentation processes require a limiting factor which acts to direct the microorganism's metabolic activities into producing the desired end-product (see previously cited Reference 7). In the biochemical production of gums from carbohydrates by bacteria of the genus Xanthomonas, the limiting factor in the prior art, as determined from data in the literature (see previously cited References 4 and 6) was based upon the weight ratio of carbohydrate to protein in the broth, to-wit:

$$C/P = \frac{\text{weight of carbohydrate}}{\text{weight of protein}}$$

Earlier work has shown a $C/P$ ratio in the range of from about 30/1 to 60/1 to be optimum for the prior art processes. The data in Table I illustrate this point.

Table I.—*Effect of C/P ratio on yield of gum produced from corn sugar*

| Broth Composition (weight percent) | | | Viscosity of Broth at End of Fermentation (Centipoises) |
|---|---|---|---|
| Amount of Corn Sugar | Amount of Protein | C/P Ratio | |
| 0 | 0.44 | ------ | 140 |
| 3 | 0.44 | 6.8:1 | 520 |
| 3 | 0.22 | 14:1 | 2,100 |
| 3 | 0.11 | 27:1 | 3,400 |
| 3 | 0.079 | 38:1 | 3,700 |
| 3 | 0.053 | 57:1 | 3,300 |
| 3 | 0.040 | 75:1 | 2,900 |
| 3 | 0.026 | 120:1 | 1,600 |

It has now been discovered that when a cereal grain such as sorghum is used as the primary carbohydrate source (i.e. over 50 weight percent preferably all of the total carbohydrate is from cereal grain), a drastic shift occurs in the $C/P$ ratio to give an optimum $C/P$ ratio in the range of from about 7/1 to 15/1, e.g. from 8/1 to 10/1 (see Table II). This discovery of a change in $C/P$ ratio was unexpected and use of this discovery produced further unexpected results in terms of rapidly effecting high yields of an improved water soluble gum product. Moreover, these high yields are obtained in shorter times and the product is superior to prior art gums. In addition, it is possible to obtain final gum products having very low bacteria counts without destroying the effectiveness of the water soluble gum.

It has been found that the quality of a protein source can be directly correlated with amino acid content, both as to the types of amino acids present and to the quantities and balance of specific amino acids. Changes in protein quality have been found to cause substantial changes in the course of the fermentation and thus the quality of a protein must be considered in the light of its intended use. A limiting factor in the present process is the quality of the protein used as the source of all, or of most, of the required organic nitrogen. Cereal grains have, in general, poor protein quality, and this makes them ideally suited for use in the present invention. With cereal grain flours, optimum $C/P$ ratios occur at about 7/1 to 15/1 as previously indicated. Moreover the amount and quality of the resulting gum product is enhanced by using, as the carbohydrate nutrient, cereal grain and a $C/P$ ratio within this range. Some of the protein may be supplied by a higher quality source, but a substantial amount must be provided by a low quality source (e.g. cereal grain). Thus, sorghum flour is an effective source of both the carbohydrate and the low quality protein and, when used alone, gives a suitable $C/P$ ratio for optimum yields. However, a cereal grain such as sorghum can be fortified with a secondary source of protein provided the The data in Table II illustrate the surprising results accomplished by shifting the $C/P$ ratio and using a low quality cereal grain flour as the primary protein source.

Table II.—*Effect of carbohydrate/protein ratio on yield of gum produced from farinaceous material*

| Amount of Carbohydrate (Percent) | Amount of Protein (Percent) | C/P Ratio | Viscosity of Broth at End of Fermentation (Centipoises) |
|---|---|---|---|
| 2.4 | 0.24 | 10:1 | 6,400 |
| 2.4 | 0.26 | 9.2:1 | 6,200 |
| 2.4 | 0.28 | 8.6:1 | 6,000 |
| 2.4 | 0.32 | 7.5:1 | 4,600 |
| 2.4 | 0.40 | 6:1 | 3,200 |
| 2.4 | 0.74 | 3.1:1 | 2,000 |

To further demonstrate that the quality of the protein is a factor, an experiment was conducted in which high quality, vitamin-free casein amino acids were added, in increasing amounts, to a farinaceous fermentation media that was otherwise within the scope of this invention. Those data are shown in Table III. They clearly show that improvement of protein quality removes the effective limiting factor orginally established, and the yields af gum are markedly reduced.

Table III.—*Effect of addition of vitamin-free casein amino acids on yields of gum produced from farinaceous material with a C/P ratio=10:1*

| Amount of 10% Casein Hydrolysate Added (Percent) | Viscosity of Broth at the End of the Fermentation Period (Centipoises) |
|---|---|
| 0 | 3,700 |
| 0.05 | 3,600 |
| 0.1 | 3,600 |
| 0.2 | 3,600 |
| 0.4 | 2,100 |
| 0.8 | 1,200 |

In general, the culture medium (broth) used in the present invention will be composed of the following components in the amounts indicated.

| | Amount, wt. percent |
|---|---|
| Raw or refined Cereal Grain Nutrient (C/P ratio of 7/1 to 15/1) | 1 to 8 (e.g. 2 to 4). |
| Buffered salt (pH range 9 to 5) | 0.25 to 1.5 (e.g. 0.4 to 0.7). |
| Water (basis for total calculations) | 100. |
| Antifoaming agent, if needed | 0–0.005. |
| Additional Organic Nitrogen, if desired (calculated as protein) | 0–0.5 (preferably .01 to .2). |

The cereal grain nutrient is preferably sorghum flour. Less preferably, other cereal grains such as corn, barley, oats, wheat and the like, may be used in the culture media provided that the C/P ratio is kept within the range indicated. The buffer may be any suitable known alkali-acid combination that will control the pH within the limits previously indicated. Such buffers are well-known in the art. Since phosphorus salts are ordinarily used in small amounts (e.g. 0.1 wt. percent) in culture media of this type, it is convenient to use an excess (e.g. 0.5 wt. percent) of those same salts as the buffer. Less preferably, slow neutralization during the fermentation may be used to control pH within the proper limits so as to enhance the yield of the desired gum. Quite obviously, pH can be controlled until a desired end point is approached and pH control can be stopped. Thus, pH may be allowed to drop below the lower indicated limit at about the time the desired end point is reached. Consequently, the pH limits herein specified refer to the pH during the significant period of fermentation. The antifoaming agent is preferably a dimethylsiloxane polymer. Less preferably, other known antifoam agents, including soy oil and the like may be utilized. Other gum producing plant pathogens of the Xanthomonas genus which may be utilized in the present process in addition to *Xanthomonas campestris* are *Xanthomonas phaseoli*, *Xanthomonas malvacearum* and the like. The amount of Xanthomonas culture added to the broth or culture media is a gum producing amount, usually in the range of about 0.5% to 10%. Added organic nitrogen can be and usually is obtained from toasted soy flour, as previously indicated. However other suitable organic nitrogen (protein) sources may be used, e.g. soybean whey, soybean residue, meat extracts, distiller's solubles, casein (including amino acids), and the like.

The present invention will be more clearly understood by reference to the following specific examples which include a preferred embodiment. Unless otherwise indicated all parts are by weight and all percentages are by weight.

*Example 1.*—A culture medium (C/P ratio of about 10/1) of the composition shown below was fermented under aerobic conditions for 50 hours at 28° C. An inoculum of one-twentieth volume of *Xanthomonas campestris* was used. The medium contained the following:

| | Percent |
|---|---|
| Grain sorghum flour | 2.8 |
| Dibasic sodium phosphate | 0.45 |
| Water, q.s. (100%). | |
| Antifoam, q.s. (1.0030%). | |

The culture viscosity reached 6000 centipoises after 50 hours. The pH dropped from 7.8 at the start to slightly below 6.6 at the end-point.

*Example 2.*—A culture medium (C/P ratio of about 8/1) of the composition shown below was fermented under aerobic conditions for 50 hours at 28° C. An inoculum of one-twentieth volume of *Xanthomonas campestris* culture was used. The medium contained the following:

| | Percent |
|---|---|
| Grain sorghum flour | 2.8 |
| Toasted soy flour | 0.12 |
| Dibasic potassium phosphate | 0.50 |
| Water, q.s. (100%). | |
| Antifoam, q.s. (0.0030%). | |

The culture viscosity reached 7300 centipoises after 50 hours of fermentation. The pH dropped from 7.8 at the start to 6.0 at the end-point. The changes in viscosity and pH that occurred during the fermentation are illustrated in FIGURE 1.

The wet whole culture of Example 2 was spray dried. The dried gum product had the properties previously described. Its thickening power in water is illustrated by the viscosity curve shown in FIGURE 2. The wet culture may be pasteurized with heat, before spray drying to eliminate the live cells of Xanthomonas bacteria. Such a procedure is ordinarily preferred.

The two examples just shown are illustrative of the preferred forms of the present invention. Less preferred are other nutrients having the proper *C/P* ratio. These may be obtained from such cereal grains as barley, corn, oats, wheat, and the like. The following example is illustrative thereof.

*Example 3.*—A culture medium (*C/P* ratio of about 7/1) of the composition shown below was fermented under aerobic conditions for 72 hours at 28° C. An inoculum of one-twentieth volume of *Xanthomonas campestris* was used. The medium contained the following:

| | Parts |
|---|---|
| Corn flour | 3.0 |
| Toasted soy flour | 0.1 |
| Dibasic sodium phosphate | 0.45 |
| Water | 100.0 |
| Initial pH adjusted to | 7.5 |

The fermentation process was stopped after 72 hours when the culture viscosity reached 4000 centipoises. The pH had dropped from 7.5 at the start to 6.6 at the end-point.

The unique nature of the inventive process herein described is further illustrated by the data shown in Table IV. These data show the increased yield and significant time reduction that are effected when the present process (illustrated by Example 2) is used.

*Table IV.—Reduction in fermentation time using the present process*

| Process | Amount of Carbohydrate, Percent | Conversion (Percent) | Amount of Gum Produced, Percent | Fermentation Time, Hours | Percent Increase in Fermentation Time |
|---|---|---|---|---|---|
| Prior Art Reference 6 | 2 | 76 | 1.5 | 65. | 30 |
| Prior Art Reference 4 | 2.7 | 54 | 1.5 | 94 | 88 |
| Present Process, Example 2 | 2.2 | 77 | 1.7 | 50 | 0 |

Thus, it will be realized that the present invention offers significant advantages to the art. Although the present invention has been described in some detail, numerous modifications and variations, falling within the scope of the invention, will be suggested and become obvious to the routineer.

What is claimed is:

1. An improved process for making water-soluble gum which comprises inoculating an aqueous culture medium containing cereal grain flour and buffer salt and having a weight ratio of carbohydrate to protein of from 7/1 to 15/1 with a fermenting microorganism of the gum producing plant pathogen genus Xanthomonas, at least 50 weight percent of said carbohydrate being provided by said cereal grain flour, initially adjusting the pH to a point within the range of 7 to 8.5, mechanically agitating and aerating the mixture while effecting fermentation of the culture medium at a temperature in the range of about 21° C. to 35° C. to thereby produce a solution of water soluble gum having a solution viscosity within the range of about 4,000 to about 12,000 centipoises at a final pH within the range of from 5 to 7, and thereafter recovering said gum.

2. A process as defined in claim 1 wherein the microorganism belongs to the species *Xanthomonas campestris*.

3. A process as defined in claim 1 wherein the cereal grain flour comprises finely ground, dehulled, degerminated, grain sorghum.

4. A process as defined in claim 1 wherein the amount of cereal grain flour in said culture medium is from 1 to about 8% by weight based on the weight of water.

5. An improved process for making water-soluble gum which comprises inoculating an aqueous culture medium containing sorghum flour and buffer salt and having a weight ratio of carbohydrate to protein of from 7/1 to 15/1 and not more than about 0.5% added organic nitrogen, calculated as protein, with a fermenting microorganism of the gum producing plant pathogen genus Xanthomonas, at least 50 weight percent of said carbohydrate being provided by said sorghum flour, initially adjusting the pH to a point within the range of 7.0 to 8.5, heating the culture medium to a temperature within the range of about 21° C. to 35° C., aerating and mechanically agitating said culture medium while fermenting said culture medium with said plant pathogen, thereby effecting the production of a solution of water-soluble gum having a solution viscosity of from about 4,000 to about 12,000 centipoises at a final pH of from 5 to 7, and thereafter recovering said gum.

6. A process as defined in claim 5 wherein the microorganism belongs to the species *Xanthomonas campestris*.

7. A process as defined in claim 6 wherein the amount of flour in said culture medium is from 1 to about 8% by weight, based on the weight of water, and wherein said sorghum flour and said added organic nitrogen provide the entire amount of said carbohydrate and said protein.

8. A process as defined in claim 7 wherein the amount of added organic nitrogen is from about 0.01% to about 0.5% and wherein the source of the added organic nitrogen is toasted soy flour.

9. An improved biochemical process for synthesizing water-soluble gum which comprises inoculating an aqueous culture medium containing cereal grain and having a weight ratio of carbohydrate to protein of from 7/1 to 15/1 with bacteria of the genus *Xanthomonas*, at least 50 weight percent of said carbohydrate being provided by said cereal grain, initially adjusting the pH to a point within the range of 7 to 8.5, aerating and fermenting said culture medium to thereby produce a solution of water soluble gum, said pH being controlled during fermentation to give a final pH within the range of from 5 to 7, and thereafter recovering said gum.

10. A process as defined in claim 9 wherein the bacteria are of the species *Xanthomonas campestris*.

11. A process as defined in claim 9 wherein the cereal grain is finely ground, dehulled, degerminated, grain sorghum.

12. A process as defined in claim 9 wherein the amount of cereal grain in said culture medium is from 1 to about 8% by weight.

13. An improved biochemical process for synthesizing water-soluble gum which comprises inoculating an aqueous culture medium containing sorghum flour and having a weight ratio of carbohydrate to protein of about 7/1 to 15/1 including not more than about 0.5% added organic nitrogen, calculated as protein, with bacteria of the genus *Xanthomonas*, at least 50 weight percent of said carbohydrate being provided by said sorghum flour, initially adjusting the pH to a point within the range of 7.0 to 8.5, aerating and fermenting the culture medium to thereby produce a solution of water-soluble gum, said pH being controlled during fermentation to give a final pH within the range of from 5 to 7, and thereafter recovering said gum.

14. A process as defined in claim 13 wherein the bacteria are of the species *Xanthomonas campestris*.

15. A process as defined in claim 14 wherein the amount of sorghum flour in said culture medium is from 1 to 8% by weight and wherein said sorghum flour and said added organic nitrogen provide the entire amount of said carbohydrate and said protein.

16. A process as defined in claim 15 wherein the sorghum flour is sterilized and solubilized with heat prior to said inoculation.

17. In a biochemical process for synthesizing water soluble gum by fermenting an aqueous culture medium containing carbohydrate nutrient material with bacteria of the genus *Xanthomonas* and thereafter recovering said gum, the improvement which comprises using cereal grain to provide at least 50 weight percent of the total amount of carbohydrate and employing a weight ratio of carbohydrate to protein in the culture medium of 7/1 to 15/1.

18. A process as defined in claim 17 wherein pH is controlled during fermentation with buffer salt.

19. A process as defined in claim 18 wherein said cereal grain comprises wheat.

20. A process as defined in claim 18 wherein said cereal grain comprises corn.

References Cited by the Examiner
UNITED STATES PATENTS 3,020,207   2/1962   Patton _____ 195—31

A. LOUIS MONACELL, *Primary Examiner.*

ALVIN E. TANENHOLTZ, *Examiner.*

UNITED STATES PATENT OFFICE
CERTIFICATE OF CORRECTION

Patent No. 3,271,267                                 September 6, 1966

Ralph O. Weber et al.

It is hereby certified that error appears in the above numbered patent requiring correction and that the said Letters Patent should read as corrected below.

Column 2, line 35, for "comparison" read -- comparisons --; column 4, line 1, after "percent" insert -- and --; line 37, after "the" insert -- appropriate C/P Ratios are not significantly exceeded. --; line 38, strike out "Table II.— Effect of carbohydrate/protein ration on yield", in italics; line 61, for "af" read -- of --; column 6, line 41, for "fluor" read -- flour --.

Signed and sealed this 22nd day of August 1967.

(SEAL)
Attest:

ERNEST W. SWIDER                                   EDWARD J. BRENNER
Attesting Officer                                                Commissioner of Patents